2,720,270
APPARATUS FOR FLUIDIZING AND RELEASING FIRE-EXTINGUISHING DRY CHEMICAL

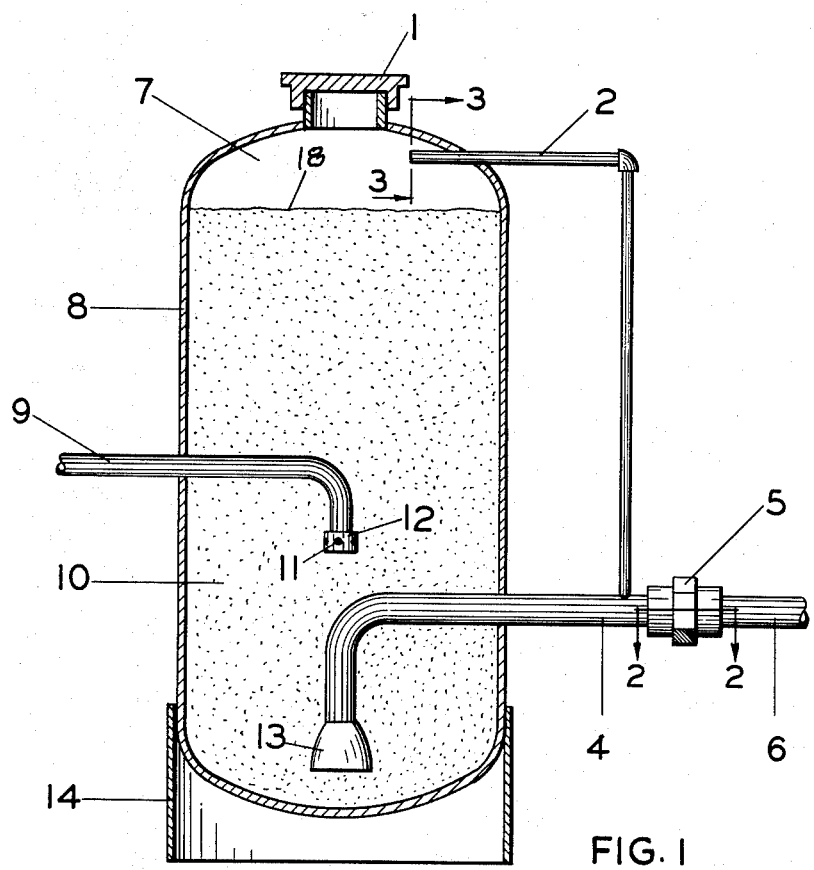
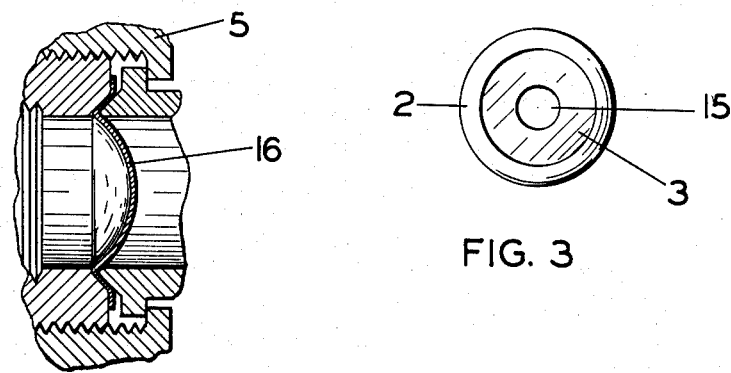
FIG. 1
FIG. 2
FIG. 3
INVENTOR.
ARTHUR B. GUISE
BY
Joseph Roseman
ATTORNEY United States Patent Office 2,720,270
Patented Oct. 11, 1955

Arthur B. Guise, Marinette, Wis., assignor to Ansul Chemical Company, Marinette, Wis., a corporation of Wisconsin Application December 17, 1952, Serial No. 326,479

3 Claims. (Cl. 169—11)

This invention relates to an apparatus for fluidizing and releasing fire-extinguishing dry chemical from a suitable storage container.

In gas pressure-type dry chemical powder fire-extinguishing equipment, the fluidizing and expellant gas is frequently stored separately and admitted to the chamber containing a dry chemical powder only when the apparatus is to be used. If the conduit leading from the dry chemical chamber is open at the time the gas is admitted to the dry chemical powder chamber, a considerable portion of the fluidizing and pressurizing gas is lost through this conduit, resulting in an undesirable ratio of dry chemical powder to expellant gas and an undesirably low rate of flow of dry chemical powder. By delaying the release of the dry chemical powder in fluidized form from the dry chemical powder chamber until the dry chemical powder has been fluidized and a predetermined pressure reached in the dry chemical powder chamber, a desirable ratio of dry chemical powder to expellant gas is obtained and an equally desirable rate of flow of dry chemical powder is maintained.

The proper control of the rate of flow of dry chemical powder is essential to the successful operation of dry chemical powder fire-extinguishing systems where the conduit from the dry chemical powder chamber leads to one or more open nozzles connected by properly designed piping to operate automatically in case of a fire. The flow of dry chemical from a dry chemical powder chamber without the necessary delay in release of the dry chemical powder until the pressure has reached a satisfactory predetermined point results in variations in the rate of flow with possible deleterious results on the fire-extinguishing effectiveness of such a system. The means provided by this invention permits the installation of automatically operated dry chemical powder piped systems which will furnish reliable fire protection. The same means can also be applied to manually operated equipment wherein either pipe lines with fixed nozzles or hose lines with manually operated nozzles are used. In all cases the use of this invention in dry chemical powder fire-extinguishing equipment will provide more reliable fire protection.

According to the present invention the dry chemical is fluidized and pressurized to a predetermined pressure in a closed chamber. The chamber is connected to a conduit for conveying the fluidized dry chemical therefrom. Delay in the release of the dry chemical from the dry chemical powder chamber is attained by using a normally closed automatically operated valve or other means, such as a bursting disc, to ensure that the pressure reaches the desired predetermined value before the dry chemical powder is released from the dry chemical powder chamber.

According to the present invention means are provided for causing the diaphragm to rupture when the pressure at the top of the dry chemical container reaches a predetermined point. At the present time, the construction of the dry chemical container is such that the outlet from the gas tube is placed so that the pressurized nitrogen gas fluidizes the dry chemical and simultaneously builds up pressure in the top of the dry chemical container while permeating through the dry chemical until it ruptures the disc at say 165 lb. per sq. in. In some cases, the dry chemical will be packed more firmly than in other cases so that the pressure will build up in the top of the container and there will be a delay before the rupture disc operates.

The present invention consists in providing a conductor or tube leading from the top of the container to a point close to the rupture disc so that when the top of the container is pressurized the pressure is transmitted to the rupture disc more rapidly than under the prior construction.

Further details and advantages of my invention will be apparent from the following specification and drawing, wherein Figure 1 is a vertical sectional view of an apparatus embodying my invention, Figure 2 is a sectional view taken along lines 2—2 of of Figure 1, and Figure 3 is a view taken along lines 3—3 of Figure 1.

Referring to the drawings, the fire-extinguishing apparatus comprises a steel cylindrical storage container 8 for storing powdered dry chemical 10 therein, such as disclosed in Patent 1,793,420, February 17, 1931, to the level 18 leaving a relatively small empty space 7 at the upper end of the container 8. The container has a smooth concave bottom surface merging with the vertical walls thereof. The container is supported by a base 14 and is provided at the top with a removable closure cap 1 for introducing fresh dry chemical into the container.

A gas inlet tube 9 is provided in the container which is adapted to be suitably connected to a source of gas pressure, such as cylinders of compressed carbon dioxide, nitrogen or air which may be under pressure of about 2000 lbs. per sq. in. The inlet tube 9 may terminate in a conventional nozzle or it may terminate with a cap 12 having a plurality of orifices 11 whose axes are substantially perpendicular to the axis of the tube and whose purpose is to diffuse the gaseous stream. This construction avoids diluting the expellant stream of dry chemical beyond a predetermined minimum value so as not to substantially alter the desired ratio of dry chemical to gas in the expellant stream.

An inwardly flared outlet 13 is provided adjacent the bottom of the container for entry therein of fluidized dry chemical. The outlet 13 is connected to pipe 4 having a frangible metal disc 16 retained in sealed relation by coupling 5.

A tube 2 is connected at one end to the upper portion of the container 8 and at the other end to pipe 4 a short distance from the coupling 5 retaining the frangible disc 16. A diaphragm 3 having a small orifice 15, as shown in Figure 3, is positioned at the upper end of the tube 2. This orifice will permit the pressurized gas to flow at a sufficiently rapid rate to build up the pressure in the container 8 under static conditions, but will not permit the gas to pass through the top of the container thereby rapidly lowering the pressure and not forcing the dry chemical out of the dry chemical container through the dry chemical exit pipe 4. When the pressure reaches a predetermined value at the top of the container 8, the disc 16 will be ruptured by the pressure transmitted thereto by the tube 2 and the fluidized dry chemical will then be supplied through supply pipe 6 at the desired ratio of gas and dry chemical.

In operation, container 8, being substantially filled with powdered dry chemical, is suitably connected by its inlet pipe 9 to a supply of compressed gas, such as nitrogen for example, at about 2000 lbs. per sq. in. pressure. The emitted gas will force a path through the dry chemical to the top of the container fluidizing the dry chemical and at the same time pressurizing the upper and lower regions of the container at about the same rate. When the pressure at the top and bottom of chamber 8 reaches a predetermined value, as for example 200 to 250 lbs. per sq. in., the diaphragm 16 will be automatically ruptured by the pressure transmitted through tube 2 and the fluidized stream of dry chemical will then freely flow into supply conduit 4.

From the foregoing description it will be seen that the present invention provides an effective dry chemical fire-extinguishing apparatus which supplies a fluidized stream of dry chemical having a substantially constant predetermined ratio of dry chemical to expellant gas. The dry chemical is first fluidized in a closed chamber by supplying fluidizing gas thereto and additional gas under pressure is admitted to the chamber in such manner as to pressurize all portions of the chamber at substantially the same rate. The dry chemical chamber is connected to a dry chemical conduit which is normally closed by a pressure-responsive valve which is actuated to open position only when the pressure in the chamber reaches a predetermined pressure.

Numerous changes and modifications may be made in the details of the invention previously described which are intended to be included within the scope of the appended claims.

I claim:

1. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, a supply conduit connected to said closed chamber for conveying said fluidized dry chemical therefrom, and normally closed pressure-responsive means in said conduit for releasing the fluidized dry chemical powder from said chamber, said normally closed means being responsive to pressure for opening same only when a predetermined pressure is attained in said chamber, and a tube connecting the top of said chamber with the said supply conduit adjacent said normally closed pressure-responsive means for transmitting fluid pressure from the top of said chamber to said pressure-responsive means.

2. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a supply conduit connected to said closed chamber for conveying said fluidized dry chemical therefrom, said conduit means being closed by a frangible diaphragm, said diaphragm being rupturable when a predetermined pressure is attained in said chamber, and a tube connecting the top of said chamber with the said supply conduit adjacent said normally closed pressure-responsive means for transmitting fluid pressure from the top of said chamber to said pressures-responsive means.

3. Fire-extinguishing apparatus for releasing dry chemical powder as defined in claim 1 wherein the tube is provided with a small orifice to permit gas pressure to be transmitted therethrough from the top of the chamber to the pressure-responsive means and restrain flow of dry chemical therethrough.

References Cited in the file of this patent
UNITED STATES PATENTS

| | | |
|---|---|---|
| 1,169,646 | Jaretzki | Jan. 25, 1916 |
| 1,889,163 | Vogel-Jorgensen | Nov. 29, 1932 |